US009524221B2

(12) United States Patent
Li et al.

(10) Patent No.: US 9,524,221 B2
(45) Date of Patent: Dec. 20, 2016

(54) CENTRALIZED MANAGEMENT MODE BACKUP DISASTER RECOVERY SYSTEM

(75) Inventors: Tak Ho Alex Li, Kowloon (HK); Cravin Zheng, Kowloon (HK); Ping Shum, Kowloon (HK)

(73) Assignee: BizCONLINE LIMITED, Kwun Tong, Kowloon (HK)

( * ) Notice: Subject to any disclaimer, the term of this patent is extended or adjusted under 35 U.S.C. 154(b) by 1673 days.

(21) Appl. No.: 12/683,902

(22) Filed: Jan. 7, 2010

(65) Prior Publication Data
US 2011/0060722 A1   Mar. 10, 2011

(30) Foreign Application Priority Data

Sep. 7, 2009   (CN) .......................... 2009 1 0169868

(51) Int. Cl.
*G06F 7/04* (2006.01)
*G06F 17/30* (2006.01)
*G06F 11/20* (2006.01)

(52) U.S. Cl.
CPC ....... *G06F 11/2097* (2013.01); *G06F 11/2038* (2013.01); *G06F 17/30082* (2013.01); *G06F 17/30174* (2013.01)

(58) Field of Classification Search
USPC ....... 707/999.2, 999.202, 999.204, 649, 650, 707/674, 686, 831; 711/162
See application file for complete search history.

(56) References Cited

U.S. PATENT DOCUMENTS 7,103,619 B1 * 9/2006 Rajpurkar ......... G06F 17/30578
8,275,749 B2    9/2012 D'Souza et al.

(Continued)

OTHER PUBLICATIONS

"Disaster Recovery and Business Continuity Auditing" Wikipedia; The Free Encyclopedia; Wikimedia Foundation, Inc., Date last updated Jun. 24, 2013, Web. Jun. 25, 2013 <http://en.wikipedia.org/wiki/Disaster_recovery_and_business_continuity_auditing#Drills>.

(Continued)

*Primary Examiner* — Bruce Moser
(74) *Attorney, Agent, or Firm* — Sughrue Mion, PLLC

(57) ABSTRACT

The present invention provides a centralized management mode backup disaster recovery system, which comprises: a control console (104) for performing centralized control on a data container (105), a backup process module (103), storage medium (101), and a standby machine (102) through respective control operations; a production server (108) responsible for controlling and managing data circulation between the production server and the storage medium in unit of data blocks; a backup process module (103) for backing up data to storage space allocated for the production server (180) by the storage medium (101) through an mirror technique and a synchronous or asynchronous technique or any other backup methods; the storage medium (101) for storing data and allocating a logic unit (200) to the production server (108) for data storage; the standby machine (102) for storing system data of the production server (108) and completing automatic running and setting of the standby machine (102) through the control console (104); and the data container (105) for recording operation modes, data information, and command requests of the control console, the production server, the backup process module, the storage medium, and the standby machine through data condition update.

29 Claims, 6 Drawing Sheets

(56) References Cited

U.S. PATENT DOCUMENTS

2007/0033356 A1\*  2/2007  Erlikhman .......... G06F 11/1456
                                                    711/162
2007/0112894 A1\*  5/2007  Okada ................. G06F 11/1471
2009/0222496 A1    9/2009  Liu et al.
2011/0218968 A1\*  9/2011  Liu et al. ...................... 707/649

OTHER PUBLICATIONS

Michelle Kessler. "Cyberattacks Prompt Computer Disaster Drills.", USA Today, May 25, 2001. Web. Jun. 25, 2013.< http://usatoday30.usatoday.com/tech/news/2001-05-24-cyberattacks-disaster-drills.htm>.

\* cited by examiner

CENTRALIZED MANAGEMENT MODE BACKUP DISASTER RECOVERY SYSTEM

TECHNICAL FIELD

The present invention relates to a centralized management mode backup disaster recovery system, and in particular relates to a centralized management mode control console applicable in a backup disaster recovery/service continuity system.

BACKGROUND

At present, servers have become one major lifeline for enterprise operations, and a plurality of different servers including mail servers and file servers are installed in enterprises with a certain scale. Data in these servers are all very important, and thus data backup has become one of the very important tasks in CIO. The most important object for backup is to store the data well, and to ensure that data in the server can be completely restored when the data in the servers are lost (no matter the data is lost due to a disaster or the data is deleted due to an error).

Enterprises having a certain amount of data will all adopt tapes as media for backup. However, as volume of data is getting larger, design defects of tapes have been gradually exposed: not only operations of the server are slowed down during the backup, but also time required is long and speed is slow; restoring speed is even slower than backup speed, and plenty of time may be consumed to search from an interminable tape for simply recovering a tiny volume; several days time is needed for restoring all the data when a disaster occurs, and operations of the enterprise are almost broken down. However, reliability, performance-to-price ratio per GB and chronicle storage of the tape cannot be replaced by other media up to now, therefore the best method is to employ another medium as a first level backup and employ tape backup as a second level chronicle storage, and thus the trend that data continually increases can be adapted.

In addition, existing backup modes need to perform separate operations on backup software in respective production servers, which brings inconvenience in management, and many operations of service transfer and data recovery all need to be implemented manually, which increases probability of errors due to man-made errors and imperils security of data to some extent. At this moment, in order to conveniently manage and operate and as well as reduce man-made errors, the inventors add a centralized management mode control console on the basis of traditional solutions, which can perform control on a data container, backup process, storage medium, and a standby machine by various control operations, and functions of fully automatic service transfer, failover, automatic virtualization, acknowledgement of snapshot success, snapshot centralized management, and autodrill can be implemented by the present invention.

And, at present, disaster recovery drill is extremely important to one mature backup disaster recovery system, and only routinized and repeatable drill methods can ensure that data in each backup is available and complete. Whereas, previous disaster recovery drill is low in efficiency, need more manpower participation, and cannot achieve perfect reliability. Autodrill of the present invention completely simplifies drill steps, and adds a computer readable drill method to ensure precise acquisition of drill results.

Existing backup disaster recovery/service continuity techniques do not have uniform centralized management control consoles, and it is always needed to log in different servers respectively and operate respectively for operating these servers, which is messy and time consuming; in order to operate systems of different platforms, a plurality of different technical knowledge should be possessed, which greatly increases difficulty. Whereas the present invention unifies operation details under different machines and different platforms through a uniform centralized management control console, which reduces messiness of operations, improves work efficiency, and reduces technical requirements.

Next, existing backup disaster recovery/service continuity techniques do not have backup and operation information in centralized data container storage environment, and have disadvantage in roundly and flexibly collecting and analyzing data and information. The present invention greatly improves this through a centralized data container.

Further, existing backup disaster recovery/service continuity techniques do not have automatic disaster recovery/drill mechanisms and techniques, and need more manpower participation to implement disaster recovery/drill, in which not only operations are complicated, but also reliability cannot be guaranteed. Automatic disaster recovery/drill of the present invention greatly reduces manpower operations through computer control modes, which reduces error probability, increases drill frequency, and ensures that the system can be effectively and quickly recovered by 100% when real disasters come.

SUMMARY

Other aspects and advantages of the present invention are partly illustrated in following description and are partly obvious from the description, or can be obtained in practices of the present invention.

The present invention conveniently centralizedly manages various production servers in production network by using control console, which reduces errors of manpower operations, effectively increases management efficiency, and reduces management cost, as well as functions of fully automatic service transfer, failover, automatic virtualization, acknowledgement of snapshot success, snapshot centralized management, and autodrill can be implemented. In addition, the present invention utilizes the SAN technique, the virtualization technique, the remote mirror technique, the IP based SAN interconnection technique, and the snapshot technique to recover important services one by one in a very short period of tens of minutes or even several minutes after a disaster comes by adopting a "recovery first and restoration second" method.

The present system comprises:

A control console for respectively performing centralized control on a data container, backup process, storage medium, a standby machine through respective control operations, and backup disaster recovery settings and operations of different machines and different platforms are consistently packaged through the centralized control console, which reduces technical requirements for users, simplifies operation difficulty, facilitates information collection and daily maintenance, and thus improves confidence of users on backup disaster recovery techniques.

A production server has host-based software installed therein, and the production server is responsible for controlling and managing data circulation between the production server and storage medium. All data transmission is in unit of data blocks and is not restricted by file archive attributes and conditions. A plurality of different setting options is set inside the software.

Backup process, in which storage space is allocated to the production server by the storage medium, and backup is performed through a mirror technique and synchronous or other asynchronous techniques or any other backup methods.

The storage medium, which is all the media that can be used to store data, such as hard disks, disk arrays, and tapes.

A standby machine having system data of protected platforms.

A data container including operation records of respective components and condition data records of the respective components.

Data is fundamentality for nowadays enterprises to survive, and service continuity is an important exhibition of life force for enterprises. Therefore, more and more enterprises select to arrange disaster recovery and even service continuity system to protect data and services. The present invention provides an easier operation method, a more efficient work mode, more comprehensive data condition information, and more stable service quality through a centralized management system and advanced automation techniques. Advantages thereof include:

1. Profound and complicated backstage disaster recovery is hided through a uniform simple operation interface, which reduces man power and technical devotion of users, therefore it can be spread in a broader client group;

2. With regard to managers, they only need to log in one management interface to manage backup disaster recovery settings of respective production servers with consistent operations and consistent information display, which avoids frequently logging in different machines and performing different operations, therefore work time can be greatly saved and messiness can be reduced, greatly increasing work efficiency;

3. The management system of the present invention can collect exhaustive backup and drill condition information and reports for the managers to timely and effectively research and analyze various data;

4. Because of a uniform operation interface and support from various automation functions, not only operation complexity is reduced, but also the automation mode reduces man-made interference, that is, the opportunity of errors is reduced, therefore services with stable quality can be provided. With regard to large scale service continuation service providers, standardized and automated flow can reduce operation cost better, so that better profits are obtained; further, issues related to secrets and privacy can be effectively solved.

The present invention provides a centralized management mode backup disaster recovery system, which comprises: a control console (104) for performing centralized control on a data container (105), a backup process module (103), storage medium (101), and a standby machine (102) through respective control operations, and backup disaster recovery settings and operations of different machines and different platforms are consistently packaged through the centralized control console to implement fully automatic service transfer, failover, automatic virtualization, acknowledgement of snapshot success, snapshot centralized management, and autodrill by the control console; a production server (108) installed with software which is host-based and has a plurality of different setting options embedded inside, the production server being responsible for controlling and managing data circulation between the production server and storage medium in unit of data blocks; a backup process module (103) for backing up data to storage space allocated for the production server (180) by the storage medium (101) through an mirror technique and a synchronous or asynchronous technique or any other backup methods; the storage medium (101) for storing data and allocating a logic unit (200) to the production server (108) for data storage; the standby machine (102) for storing system data of the production server (108) and completing automatic running and setting of the standby machine (102) through the control console (104); and the data container (105) for recording operation modes, data information, and command requests of the control console (104), the production server (108), the backup process module (103), the storage medium (101), and the standby machine (102) through data condition update.

The present invention further provides a centralized management mode control console applicable in a backup disaster recovery/service continuity system including one or more of a backup process module, storage medium, and a virtual platform standby machine, comprising: a data container for recording data information and various command requests issued respectively by a control console, a production server, the backup process module, the storage medium, and the virtual platform standby machine with a data carrier through data condition update; and a control console program module for performing backup disaster recovery and service continuity control on the data container, the backup process module, the storage medium, and the virtual platform standby machine respectively through respective control operations, and the control console program module performs following operations: automatically constructing the virtual platform standby machine, converting a system disk mirror or backup disk of the production server backed up in the storage medium to a standby system recognizable by the virtual platform standby machine by using an automatic physical-to-virtual conversion technique to enable the standby system to operate as virtual machine mode, completing automatic running and setting of the virtual machine through the centralized management control console, and constructing the virtual platform standby machine that can be actually effectively used on the virtual platform; and performing a drill/autodrill operation, wherein corresponding data disk snapshots in the storage medium can be mounted by setting separation between virtual platform standby machine network and the production network, for being assigned to the virtual platform standby machine, the system disk of the production server loaded by the virtual platform standby machine may remain unchanged, the virtual platform standby machine is initiated, and availability and integrity of the system and data are checked manually or by programming corresponding programs and scripts.

A centralized management mode control method of a centralized management mode backup disaster recovery system including one or more of a data container, a backup process module, storage medium, and a standby machine, comprising:

centralized control is respectively performed on the data container, the backup process module, the storage medium, and the standby machine according user selection through respective control operations by a control console, backup disaster recovery settings and operations of different machines and different platforms are consistently packaged to implement fully automatic service transfer, failover, automatic virtualization, acknowledgement of snapshot success, snapshot centralized management, and autodrill, and the control operations performed by the control console comprise: controlling the data container to record operation conditions, data information, and command requests of the control console, a production server, the backup process module, the storage medium, and the standby machine through data condition update; controlling the storage medium to allocate storage space for the production server to perform backup for data of the production server; converting a system disk mirror or backup disk of the production server backed up in the storage medium to a standby system recognizable by a virtual platform standby machine by using an automatic physical-to-virtual conversion technique to enable the standby system to operate as virtual machine mode, completing automatic running and setting of the virtual machine through the centralized management control console, and constructing the virtual platform standby machine that can be actually effectively used on the virtual platform; and controlling the standby machine to perform a drill/autodrill process, wherein corresponding data disk snapshots in the storage medium can be mounted by setting separation between virtual platform standby machine network and the production network, for being assigned to the virtual platform standby machine, the system disk of the production server loaded by the virtual platform standby machine may remain unchanged, the virtual platform standby machine is initiated, and availability and integrity of the system and data are checked manually or by programming corresponding programs and scripts.

BRIEF DESCRIPTION OF THE DRAWINGS

The above and other objects, features, and advantages of the present invention will become clearer from the detailed description of preferred embodiments of the present invention in conjunction with the attached drawings, in which same reference numbers indicate units with same structure and in which The attached table is for explaining the present invention in conjunction with the specification.

DETAILED DESCRIPTION

Figure 1:
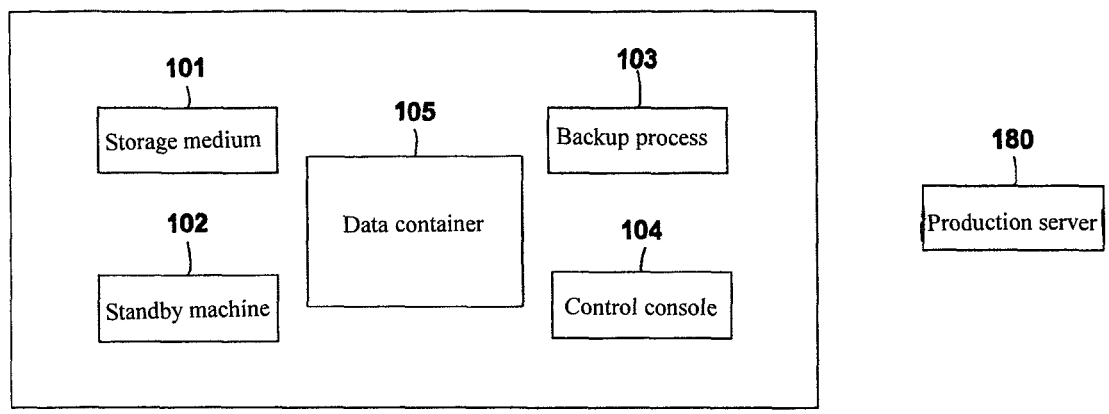
FIG. 1 is a diagram of an overall solution according to the present invention.

Hereinafter, the present invention will be fully described with reference to the figures showing embodiments of the present invention. However, the present invention can be implemented in many different forms, rather than being considered as being limited to embodiments described herein. On the contrary, these embodiments are provided to make disclosure of the present invention thorough and complete and to fully express scope of the present invention to those skilled in the art. Descriptions of well known functions and structures will be omitted for clarity and conciseness. In the figures, components are amplified for clarity.

Unless otherwise defined, all terms used herein (including technical and scientific terms) have same meanings to those commonly understood by those of ordinary skills in the art that the present invention belongs to. It is also understood that terms such as those defined in general dictionaries should be construed as having meanings consistent with meanings of the terms in the context of related arts, rather than being construed with idealized or extremely formalized meanings, unless being explicitly defined herein.

The centralized management mode backup disaster recovery system comprises: a control console 104, which is a control platform installed with host-based software to centralized control production server end, through which functions of fully automatic service transfer, failover, automatic virtualization, acknowledgement of snapshot success, snapshot centralized management, and autodrill can be implemented; a production server 108 installed with host-based software, the production server being responsible for controlling and managing data circulation between the production server and storage medium, in which all data transmission is in unit of data blocks and is not restricted by file archive attributes and conditions, and a plurality of different setting options is set inside the software; the storage medium 101, which is all the media that can be used to store data, such as hard disks, disk arrays, and tapes and is responsible for allocating a logic unit 200 to the production server 108 for data storage, the production server 180 backing up data from disk backup into the allocated logic unit 200 through a backup process 103; a standby machine 102 for storing system data of protected platforms, in which physical machines or virtual standby machines and devices compatible with production machines can be used as a backup production platform; the backup process 103, the storage medium 101, the standby machine 102 and the control console 104 update the data conditions into the data container 105.

Hereinafter, the present invention is explained with preferred embodiments, and specific structures, steps, and configurations mentioned therein are for illustration purpose. Those skilled in the art should implement the present invention with same structures, steps, and configurations without departing from the concept and spirit of the present invention.

FIG. 1 is a diagram of an overall solution according to the present invention, and embodiments can be implemented according to this figure. The backup disaster recovery system comprises a production server 108 having host-based software installed, and the production server 108 is responsible for controlling and managing data circulation between the production server and storage medium in conjunction with installed communication protocols (such as Internet Small Computer System Interface (ISCSI)). All data transmission is in unit of data blocks and is not restricted by file archive attributes and conditions, and a plurality of different setting options is set inside the software. A storage medium 101 is all the media that can be used to store data, such as hard disks, disk arrays, tapes, the storage medium 101 allocates storage space for the production server 180, and the production server 180 backs up data from the disk into the allocated storage space. A standby machine 102 stores system data of protected platforms, and virtual standby machines and virtualized production platforms can be used as the standby machine 102. A control console 104 is a control platform installed with host-based software to centralizedly control production server end. The backup process 103, the storage medium 101, the standby machine 102 and the control console 104 update the data conditions into the data container 105.

Figure 2:
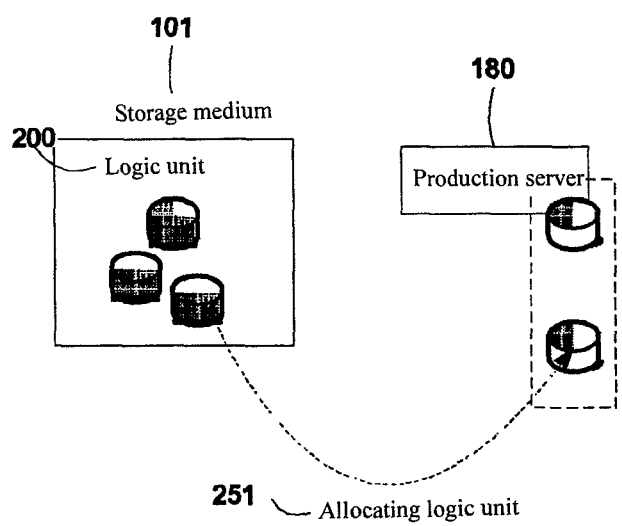
FIG. 2 is a flow diagram of a configuration according to the present invention.

FIG. 2 is a flow diagram of a configuration according to the present invention, and embodiments can be implemented according to this figure. The centralized management mode backup disaster recovery is installed at the storage medium 101, and a logic unit 200 is created and a logic unit is automatically allocated 251 to the production server 180 according to the size of backup data of the production server, and the size of the logic unit 200 is automatically expanded through settings.

Figure 3:
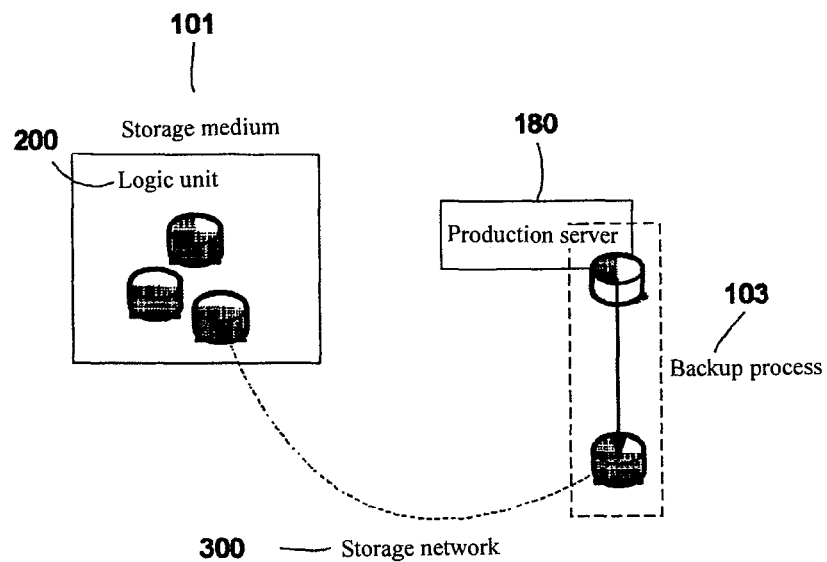
FIG. 3 is a diagram of backup architecture according to the present invention.

FIG. 3 is a diagram of backup architecture according to the present invention, and embodiments can be implemented according to this figure. The backup process 103 of the production server 180 is that a physical disk is mirrored to obtain a mirror disk through the mirror techniques such as the asynchronous mirror technique and the data is backed up to the logic unit 200 allocated by the storage medium 101 through storage network 300. And such backup process is differentiated backup, and the data is incremental backup. The resource usage situation of the whole backup disaster recovery system can be monitored by the control console 104, and if resources used by production network are relatively large, resources used by the backup process will be controlled. Otherwise, the resources used by the backup process will be automatically increased, and the production network has the highest priority.

Figure 4:
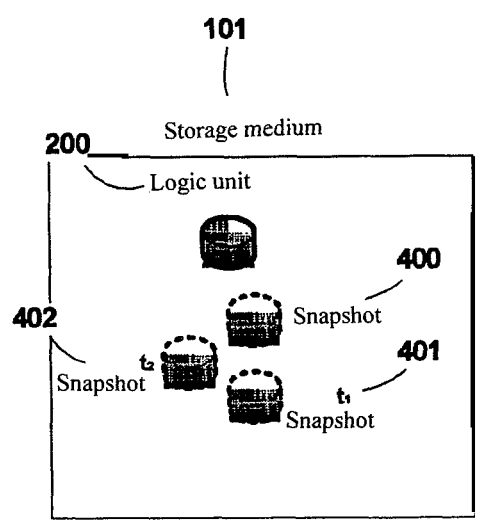
FIG. 4 is a diagram of snapshot architecture according to the present invention.

FIG. 4 is a diagram of snapshot architecture according to the present invention, and embodiments can be implemented according to this figure. Basic data and a snapshot 400 are included in the logic unit 200 of the storage medium 101, and a snapshot is a complete and independent recorded mapping of data contents and conditions of the logic unit 200 at a certain point-in-time. No matter the logic unit is used as backup for the system disk or the data disk, one snapshot mapping can be created at a certain time point, and data contents and conditions at that time point can be re-extracted later. The snapshot can support creating a plurality of mapping versions at different time points, such as a snapshot 401 and a snapshot 402. The snapshot herein records all data in the disk, time of the snapshot 400 can be set in the control console 104 through the installed centralized management mode backup disaster recovery software, and the snapshot 400 will be performed once at a preset time, and it can be viewed whether the snapshot 400 is successful and valid.

According to the definition of snapshots by the Storage Networking Industry Association (SNIA), the snapshot is one completely available copy with respect to specified data sets, and the copy contains a mapping of corresponding data at a certain time point (the time point at which the copying begins). The snapshot may be one duplication of the data that it represents, and may also be one reproduction of the data.

From the angle of specific technical details, the snapshot is a quote flag or pointer pointing to the data stored in the storage device. It can be understood as that the snapshot is sort of like a detailed catalogue table but the table is treated as complete data backup by computers. Refer to following webpage for detailed principles of the snapshot technique: http://www.sansky.net/article/2007-05-13-snapshot-theory.html.

Figure 5:
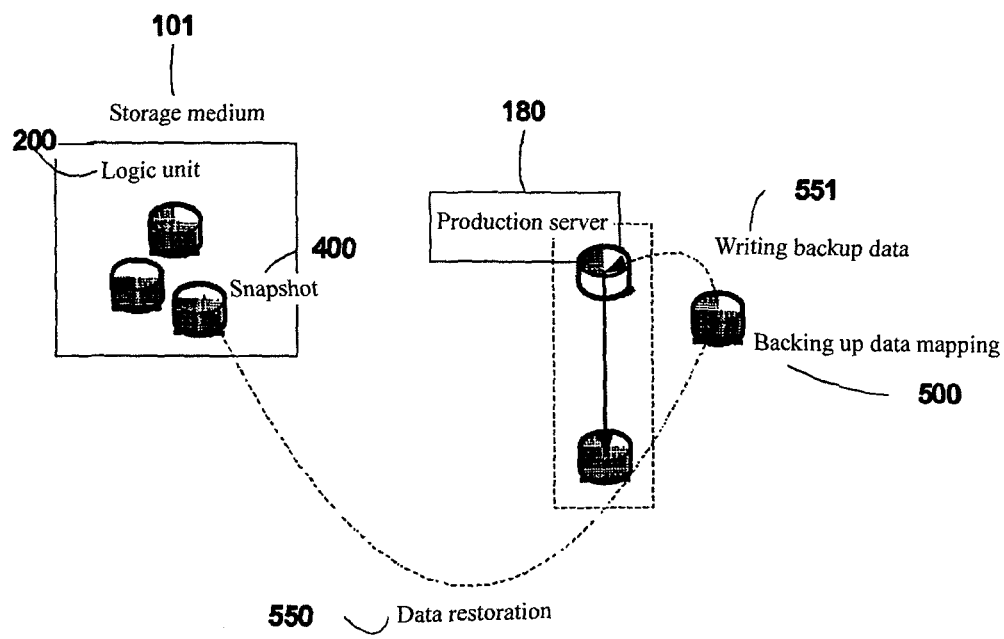
FIG. 5 is a diagram of restoration architecture according to the present invention.

FIG. 5 is a diagram of restoration architecture according to the present invention, and embodiments can be implemented according to this figure. The basic data and snapshot 400 in the logic unit 200 allocated by the storage medium 101 are passed through data restoration 550, and backup data mapping 500 is written into backup data 551, which is sent into tapes of the production server.

Figure 6:
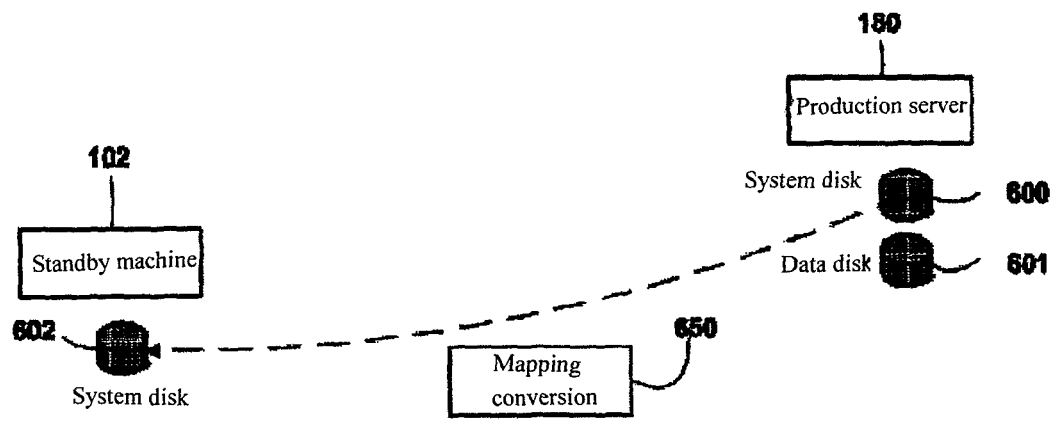
FIG. 6 is a diagram of system mirror conversion architecture according to the present invention.

FIG. 6 is a diagram of system mirror conversion architecture according to the present invention, and embodiments can be implemented according to this figure. Here, the standby machine 102 may be independent computer devices such as physical machines or virtual machines, and for example, a system disk 600 and a data disk 601 are included in the production server 180, the system disk 600 is mirror-converted 650 to a backup system disk 602 recognizable by the standby machine 102 by using copying or virtualized mirror technique. If the standby machine 102 uses a virtual machine platform, then automatic running and setting of the virtual machine and Auto P2V can be completed through an integrated control console. The system converts a system disk mirror (or backup) disk of the production server backed up in the storage medium to a standby system recognizable by a virtual platform standby machine by using an automatic physical-to-virtual (P2V) conversion technique to enable the standby system to operate as virtual machine mode. Since the conversion operation is only applicable to resources in the storage medium 101, resource overhead of the production system can be reduced extremely effectively. Meanwhile, automatic running and setting of the virtual machine, for example network setting, storage setting and service setting, are completed through the centralized control console to construct a standby machine that can be actually effectively used on the virtual platform.

Figure 7:
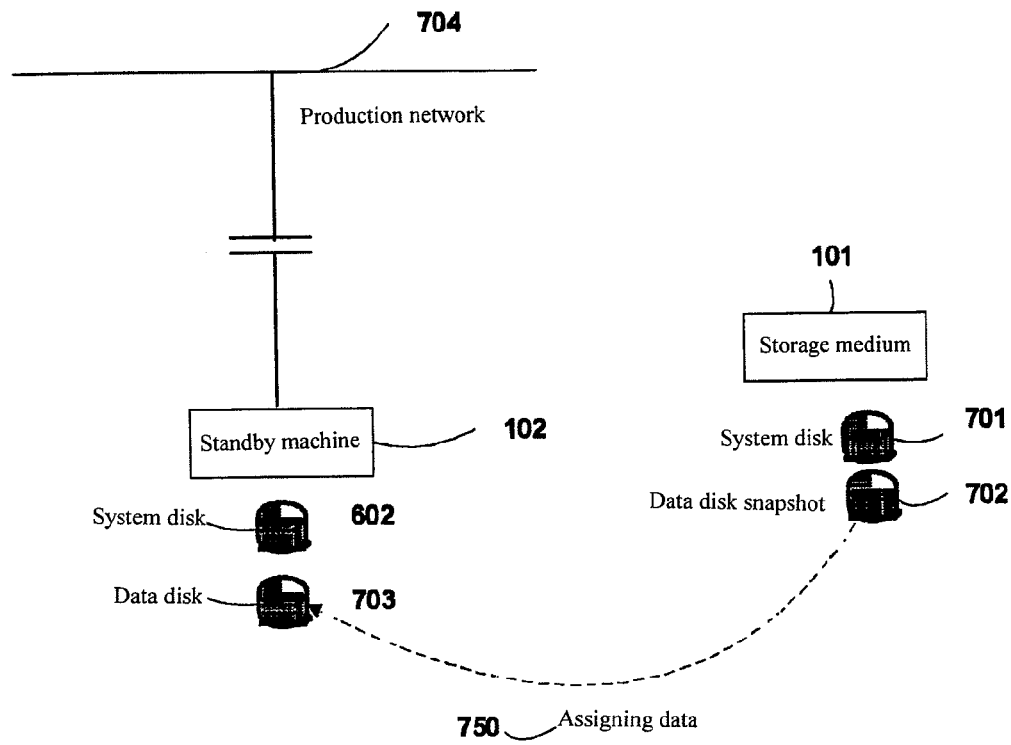
FIG. 7 is a diagram of drill architecture according to the present invention.

FIG. 7 is a diagram of drill architecture according to the present invention, and embodiments can be implemented according to this figure. Drill in an embodiment is performed in the case that an external production network 704 is disconnected. The standby machine 102 has a system disk 602 of the production server 180 installed, corresponding data disk snapshots 702 in the storage medium 101 are mounted, for being assigned to the standby machine 102, and a data disk 703 has same data to a data disk snapshot 702. The standby machine 102 is initiated to view integrity of the system and data. This process can be automatically implemented through the control console 104. The standby machine 102 is provided with the system disk 602 of the production server, corresponding data disk snapshots 702 (snapshot or similar point-in-time mirror technique) in the storage medium 101 can be mounted by setting separation between virtual standby machine network and production network through the control console (104), for being assigned to the virtual standby machine, and the system disk 602 may remain unchanged. The virtual standby machine 102 is initiated, and availability and integrity of the system and data are checked manually or by programming corresponding programs and scripts. For example, with respect to general database servers, data can be periodically added into a predefined test table, and the number of recordings can be checked through script programs during the drill. Further, a mail server can send one test mail to the virtual platform standby machine each day, so as to check whether drill results obtained by this mail exist in the snapshot or not by using the programs or the scripts. This process is automatically implemented through the centralized control console.

Figure 8:
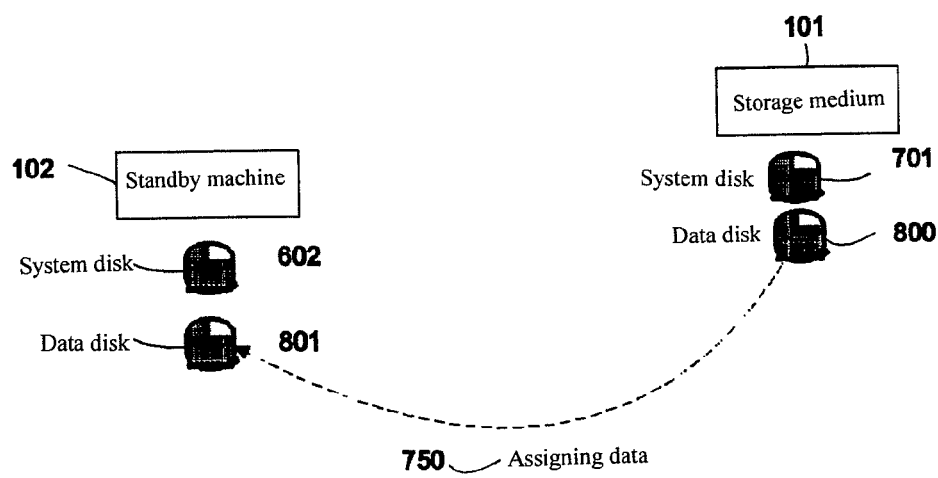
FIG. 8 is a diagram of failover architecture according to the present invention.

FIG. 8 is a diagram of failover architecture according to the present invention, and embodiments can be implemented according to this figure. The standby machine 102 has the system disk 602 of the production server 180 installed. When situations that result in system failure outage such as system breakdown, hardware or storage faults, etc. occur in the production server 180, a mirror disk 800 of a corresponding data disk in the storage medium 101 cancels assignment to the original production server, and reassigns data 750 to the standby machine 102 to form a data disk 801 in the standby machine, and the system disk 602 may remain unchanged. The standby machine is initiated, and data recently backed up to the mirror disk 800, i.e., data of the current data disk 801 of the standby machine, can be immediately applied to recover production. This process can be automatically implemented through the control console 104.

Figure 9:
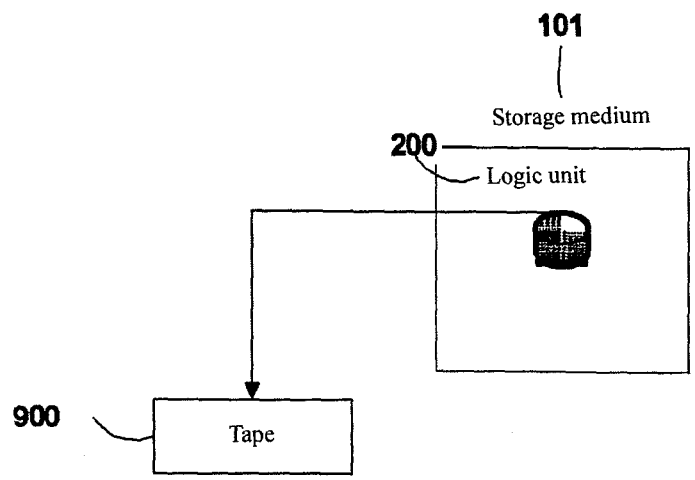
FIG. 9 is a diagram of backup to tape architecture according to the present invention.

FIG. 9 is diagram of backup to tape architecture according to the present invention, and embodiments can be implemented according to this figure. With respect to the storage medium 101, a storage server can be adopted. Data in a logic unit 200 of the storage server can be simply directly backed up to a tape 900 through backup software.

Figure 10:
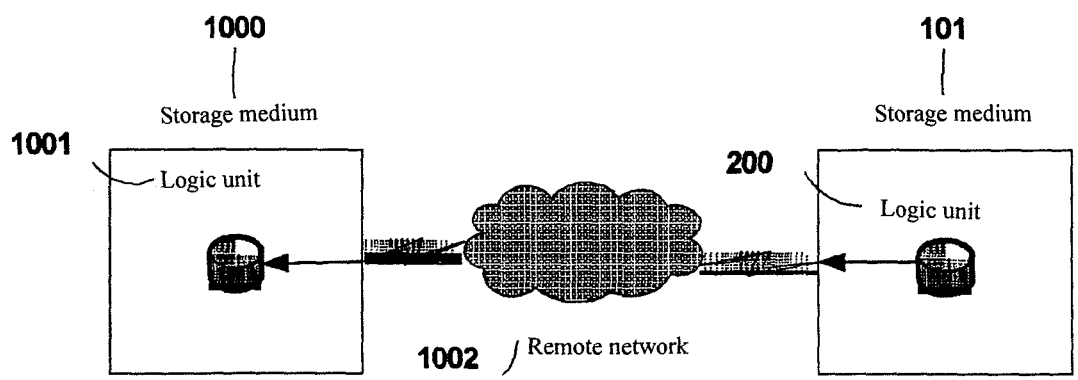
FIG. 10 is a diagram of remote backup architecture according to the present invention.

FIG. 10 is a diagram of remote backup architecture according to the present invention, and embodiments can be implemented according to this figure. With respect to the storage medium 101, the storage server can be adopted. Data in the logic unit 200 of the storage server is backed up to a logic unit 1001 of storage medium 1000 through remote network 1002.

Figure 11:
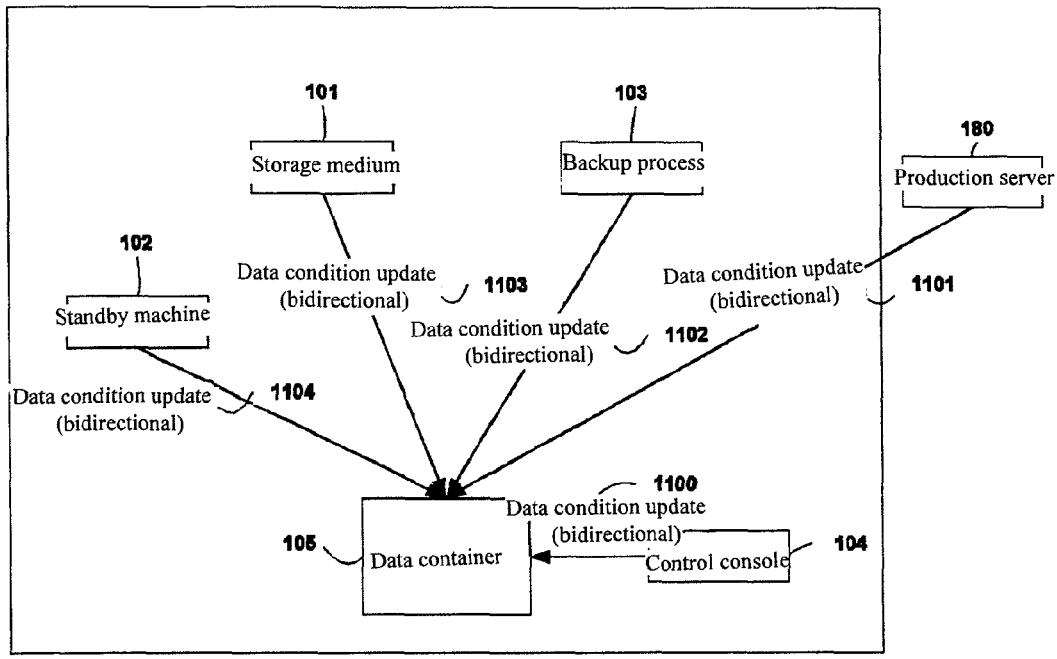
FIG. 11 is a diagram of data container architecture according to the present invention.

FIG. 11 is a diagram of data container architecture according to the present invention, and embodiments can be implemented according to this figure. A data container 105 respectively records data information and various command requests issued respectively by the control console 104, the production server 180, the backup process 103, the storage medium 101, and the standby machine 102 with database or text data carriers through data condition update (bidirectional) 1100, 1101, 1102, 1103, and 1104.

Figure 12:
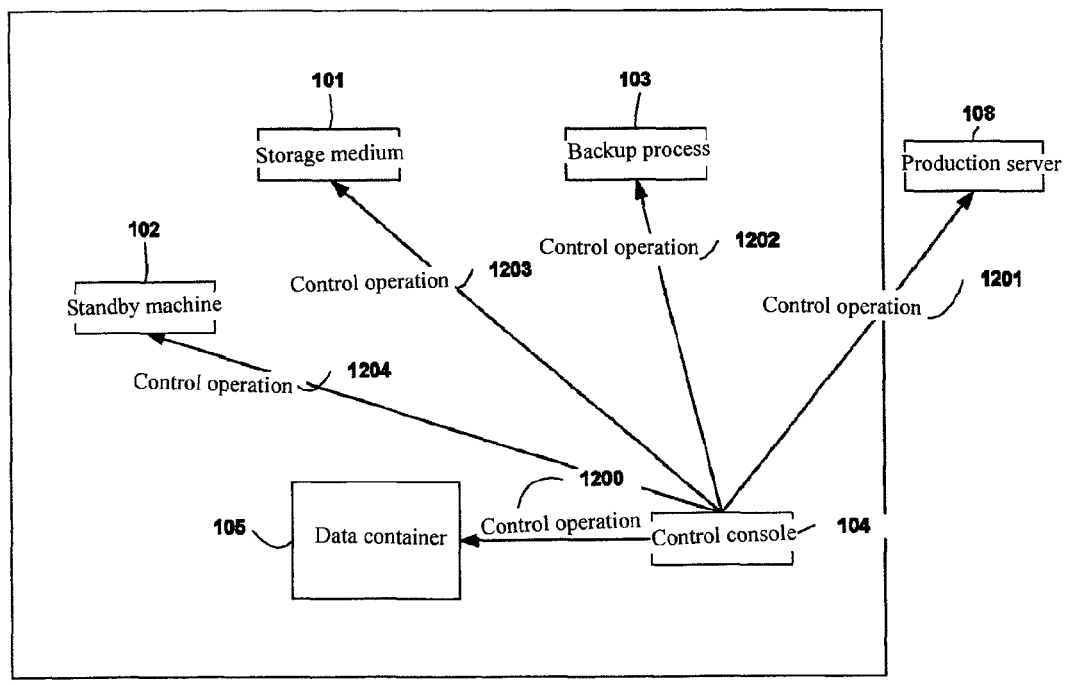
FIG. 12 is a diagram of control console architecture according to the present invention.

FIG. 12 is a diagram of control console architecture according to the present invention, and embodiments can be implemented according to this figure. The control console 104 respectively performs control on the data container 105, the backup process 103, the storage medium 101, and the standby machine 102 through respective control operations 1200, 1201, 1202, 1203, and 1204. Integration compatibility can be implemented for storage medium and virtual server products from different manufacturers and of different models through the control console. For example, during backup at ordinary times, journals of modified data are transmitted to journal replaying virtual machine of the virtual server through backup software in the production server, and the journal replaying virtual machine directly replays the journals to backup resources allocated by the storage medium 101 for the virtual server; when disaster recovery or service continuation is to be performed, the backup resources can be quickly re-allocated to the automatically virtualized standby machine 102 through the control console, and standby system can be immediately initiated to recover production service.

Functions and features of the control console in the present invention are explained by using preferred embodiments.

It is assumed that the current IT environment is four production servers, one storage server, and one standby machine.

A control console of centralized management mode backup disaster recovery software of the present invention is installed in one of computers of the production network, and centralized management of the respective production servers can be implemented in this computer by running the centralized management mode backup disaster recovery software of the present invention.

Respective logic units can be simply and easily allocated in the storage server and sizes of the respective logic units can be customized through the control console of the centralized management mode backup disaster recovery software of the present invention. Any production server to be backed up can be selected from the production network directly in the control console of the centralized management mode backup disaster recovery software of the present invention, then partitions to be included are selected, and various manners and parameters can be set for this protection. It is selected whether the backup manner is a continuous mode or a timing mode, operation time of snapshots is customized, and network bandwidth is backed up.

Automatic backup and recovery of respective production servers can be simply and easily implemented through the control console of the centralized management mode backup disaster recovery software of the present invention. The control console will automatically back up data in the production server to the storage server in manner of incremental backup according to setting situations of the user. When recovery is needed, it is only needed to click and select a recovery function to easily recover the data from the storage server to the production server.

Automatic snapshot and manual snapshot functions of the respective production servers can be simply and easily implemented through the control console of the centralized management mode backup disaster recovery software of the present invention. The user only needs to select any production server to set the snapshot function in the control console and set related mode and parameters of the snapshot for the production server.

In the control console of the centralized management mode backup disaster recovery software of the present invention, viewing of various conditions of respective production servers can also be simply and easily implemented. It is only needed to click and select any production server, and data conditions of the production server such as variation amount situation of the data, usage situation of the disk such as whether an alert value of automatic expansion has been reached, usage situation of CPU and respective resources in the server, and event log at this moment can be viewed.

All operations related to backup disaster recovery can be centralizedly processed through a uniform and centralized control console interface of the present invention, and it is not needed to respectively log in respective production and standby (virtual) servers to perform operations, which increases efficiency. Meanwhile, the uniform interface can hide complicated and varied backup disaster recovery methods behind, that is, no matter mirror or archive replication backup techniques originated from different manufacturers, or storage systems of different brands and different architecture, or even varied virtual machine implementation manners such as host manner and uncovered metal manner are used, they all can be indeed incorporated into the centralized management mode control console of the present invention, for being uniformly managed, which achieves an object of sufficiently utilizing existed resources and sufficiently exerting features of respective components and simplifies difficulty in training and operation. The data container can also be used to retrieve various information of backup conditions and service continuity. Everyone will have a chance to become a backup disaster recovery expert by this control console technique.

As compared with the traditional physical disaster recovery mode, implementing disaster recovery with the virtual platform standby system can greatly save investment of backup system expenses and resource consumption, and can greatly reduce the problem of compatibility between the standby system and production system hardware at the same time. The technique of automatically constructing virtual standby machine technique of the present invention can hide and integrate the complicated and messy techniques behind, so that ordinary operators can immediately achieve desired effects through simple buttons. Furthermore, the integration of backup techniques in the present invention can directly perform physical-to-virtual (P2V) conversion operation with mirrors of the storage medium, so that the system resources of the production server are not occupied.

The drill/autodrill function of the present invention is also a thorough progress of the prior techniques, which can implement a drill test independent from the production server on the basis of the virtual platform standby machine technique, which does not affect the normal operation of the production system. And powerful functions of the centralized mode control console completely achieve automatic control of the complicated operation steps behind the drill function, and can also implements a periodical drill test without human participation through automated programs and program-controlled techniques. By the periodical drill, it can be simulated whether the backed up system and data are available when a real disaster occurs and ensure that the data is complete and available, that is, the user himself/herself can check the backup disaster recovery system in several minutes through effective convenient measures, rather than the case that conditions of backup data are viewed only when a real disaster comes in the traditional tape and double-machine disaster recovery manner.

According to the above description of the specific embodiments, the present invention extrudes the following three aspects:

1. the centralized mode control console/data container, and the present invention is implemented by the centralized mode control console, 2. automatically constructing the virtual standby machine (AutoDRMachine), 3. Drill/Autodrill function.

The above three aspects all incorporate backup, storage, and virtual machine technique. The present invention applies these components, revolutionarily harmoniously integrates these components by incorporating techniques of the above mentioned three aspects, and achieves a backup disaster recovery system which is highly easy to use, humanized, highly efficient, and stable.

The centralized management mode control console of the present invention means that the production server, the storage medium, and the virtual platform standby server elements in the backup disaster recovery system are all backed up, operations related to disaster recovery are all completed by one uniform operation interface, and all the operations and condition information can be stored into one centralized data container for retrieval and reference at the same time. Below is more explicit or deeper description of the innovative functions of the centralized management mode control console of the present invention:

| *1. The centralized management mode control console | |
|---|---|
| Operation techniques | The centralized management mode control panel is composed of the data container and control panel programs. The data container respectively records data information and various command requests issued respectively by the control console, the production server, the backup process, the storage medium, and the virtual platform standby machine with database or text data carriers through data condition update. The control panel programs performs backup disaster recovery and service continuity control on the data container, the backup process, the storage medium, and the virtual platform standby machine respectively through respective control operations. |
| Prior techniques | In all the existing backup disaster recovery systems, the backup software, the storage server, the virtual standby system operate independently. In order to operate and control different production servers or storage servers, people must log in respective machines, and if some operations related to several components are encountered, people may operate these components back and forth, which is low in efficiency and increases complexity, thus resulting in that harmonious incorporation of the respective backup components cannot be achieved. Further, for example, people backs up data into the storage server with the backup software, but lacks effective control on the virtual machine, and cannot implement the disaster recovery; or the complete backup technique and virtual platform are included, but they are not connected by effectively applying features of the storage server.<br>Meanwhile, when there are backup software or storage servers from several different manufacturers in one backup disaster recovery system, the operator and manager need to know operation methods of several different software systems simultaneously, which greatly increases difficulty in learning and training and increases probability of errors. Even though it is a product from a same manufacturer, similar problems might still be encountered when facing the situation of software upgrade. |

-continued

| | |
|---|---|
| | In addition, it is very inconvenient with respect to independent components when operation records and running conditions of the whole backup disaster recovery system are needed to be viewed. |
| Advantages | Through the uniform and centralized control console interface, all the operations related to backup disaster recovery can be centralizedly processed, and it is not needed to log in respective production and standby (virtual) servers respectively to perform operations, which increases efficiency. Meanwhile, the uniform interface can hide complicated and varied backup disaster recovery implementation methods behind, that is, no matter mirror or file replication backup techniques originated from different manufacturers, or storage systems of different brands and different architecture, or even varied virtual machine implementation manners such as host manner and uncovered metal manner are used, they all can be indeed incorporated into the centralized management mode control console of the present invention, for being uniformly managed, which achieves an object of sufficiently utilizing existed resources and sufficiently exert features of respective components and simplifies difficulty in training and operation. The data container can also be used to retrieve various information of backup conditions and service continuity. Everyone will have a chance to become a backup disaster recovery expert by this control console technique. |

*2. Automatically constructing virtual standby machine (AutoDRMachine)

| | |
|---|---|
| Operation techniques | The system disk mirror (or backup) disk of the production server backed up in the storage/SAN is converted to a standby system recognizable by a virtual platform standby machine by using an automatic physical-to-virtual (P2V) conversion technique to enable the standby system to operate as virtual machine mode. Meanwhile, automatic running and setting of the virtual machine are completed through a centralized management control console to construct the standby machine that can be actually effectively used on the virtual platform. |
| Prior techniques | Using the virtual machine as the standby machine in the backup disaster recovery system has many advantages, but how to convert the physical machine to a completely same virtual machine mode needs relatively high technical requirements. Although at present various virtual machine manufacturers all provide respective "physical-to-virtual" (P2V) tools, operations thereof are often relatively messy and are difficult to handle for ordinary people. Also, prior conversion techniques need to perform direct and online conversion from the production server because they have not integrated the backup technique, which consumes a lot of resources of the production server. Correspondingly, in order to configure the converted virtual machine to quickly and stably perform failure transfer and Drift test operations, more advanced complicated techniques are needed, and there is a relatively high requirement even for operators with computer knowledge bases. |
| Advantages | As compared with the traditional physical disaster recovery manners, implementing the disaster recover with the virtual platform standby system can greatly save investment of backup system expenses and resource consumption, and can greatly reduce the problem of compatibility between the standby system and production system hardware at the same time. The technique of automatically constructing virtual standby machine technique of the present invention can hide and integrate the complicated and messy techniques behind, so that ordinary operators can immediately achieve desired effects through simple buttons. Furthermore, the integration of backup techniques in the present invention can directly perform physical-to-virtual (P2V) conversion operation with mirrors of the storage medium, so that the system resources of the production server are not occupied. |

*3. Drill/AutoDrill function

| | |
|---|---|
| Operation techniques | The virtual machine is provided with the virtual system disk of the standby production server (the virtual standby machine, above 2 AutoDRMachine). Corresponding backup data disk snapshots (storage snapshot/SAN snapshot or similar techniques) in an application server can be mounted by setting separation between virtual machine network and the production network, for being assigned to the virtual standby machine. The virtual standby machine is initiated, and availability and integrity of the system and data are checked manually or by programming corresponding programs and scripts. This process can be automatically implemented through the centralized control console. |

| | | -continued | |
|---|---|---|---|
| Prior techniques | | As such, Drill/AutoDrill is another novel technique of the present invention. Previous backup disaster recovery systems such as tape and double-machine all cannot perform Drill on the backup data and the backup system. For example, in order to perform a test for the tape, data in the tape is needed to be restored to hard disk, and if data volume is large, it will consume several hours and several days time. In addition, for example, difficulty for Drill of the double-machine system is big, and the test is to be simulated by cutting off activated machines in the production system. Test failure will even bring unrecoverable severe faults. Such a big cost makes the Drill under prior technique environment inoperable, and the Drill will even be abandoned. Thus, the backup function cannot be effectively monitored, and the confidence of the system manager in recovering the system when encountering the real disaster is reduced without the Drill. | |
| Advantages | | The Drill/AutoDrill function of the present invention is also a thorough progress of the above problems, which can implement a Drill test independent from the production server on the basis of the virtual platform standby machine technique, which does not affect the normal operation of the production system. And powerful functions of the centralized mode control panel completely achieve automatic control of the complicated operation steps behind the Drill function, and can also implements a periodical Drill test without human participation through automated programs and program-controlled techniques. By the periodical Drill, it can be simulated whether backed up system and data are available when a real disaster occurs and ensure that the data is complete and available, that is, the user himself/herself can check the backup disaster recovery system in several minutes through effective convenient measures, rather than the case that conditions of backup data are viewed only when a real disaster comes in the traditional tape and double-machine disaster recovery manner. | |

Furthermore, by the description of the particular embodiments of the present application in conjunction with the figures, the present invention also includes an advanced data backup function, which means providing data backup indices with higher efficiency and higher performance for the data backup and providing a more powerful backup management and backup expansion function. Below is description of the advanced data backup function of the present invention:

| | Function | Operation techniques | Advantages |
|---|---|---|---|
| 1 | High performance data backup technique | Physical disks of the production server make disk mirrors back up the data into the storage medium through IP, FC protocol high speed storage network by using the mirror technique such as the synchronous or asynchronous mirror technique. Meanwhile, this backup process can support differentiated or incremental data backup technique. | As compared with the traditional backup techniques, the present invention mainly uses the disk based mirror technique in cooperation with the high speed backup network, greatly reduces backup windows of the traditional disk backup, and can maximally obtain data loss close to zero, i.e., very high RPO indices can be obtained. Meanwhile, a lot of system overhead can be saved with the differentiation backup technique. |
| 2 | Mirror data snapshot function | The storage medium required by the present invention can create several point-in-time snapshots for the backup data or mirror, and each one of the snapshots is one independent and undisturbed mapping version. Meanwhile, creating time and volume policies of the snapshots can be set through the centralized management mode control console. | Being different from the operation difficulties of snapshot for the production system, the present invention can obtain multiple versions of mappings of the backup data by performing snapshot for the backup data. When the original mirror is not available due to encountering virus and data breakdown, the healthy snapshot version can be used to recover data, and the traditional messy operation of replacing |

-continued

| Function | Operation techniques | Advantages |
|---|---|---|
| 3 Virtualized backup storage management function | The storage medium required by the present invention can integrate physical storage resources of different volumes and different brands into a storage cell through the virtualization technique, and the logic units are allocated according to demands in manner of storage cell. Meanwhile, the manner of binding and combining several logic units to a "group" can also be used in backup application. | tapes everyday can be completely reduced or avoided. Further, since using snapshots will not destroy original backup data, the snapshots can be utilized to perform disaster recovery Drill, patch test, or other extension applications. Used physical storage resources can be flexibly and reasonably utilized by using the virtualized storage cell technique, which is not restricted by single physical storage or a single tape, and thus the case of wasting space will not occur. Compatibility with physical devices of different brands can also effectively protect existing investment. Further, the backup manner supporting the "group" implements completely synchronous operations to the backup resources bound to the group, such as backup or snapshot, so as to ensure consistency and reliability of the backup data under complicated application data storage environment. |
| 4 Remote replication | Through the storage medium required by the present invention, backup data of one site can be transmitted to another remote site in data block replication manner or in log shipping manner over remote network such as wide area network and Internet, to implement remote or foreign-place replication of backup data. The remote replication can set transmission trigger and network bandwidth adaptation policies through the centralized management mode control console, and supports advanced functions of incremental transmission and compression encryption at the same time. | Through the remote replication of the backup data, the data can be saved as one more copy at a remote end, which can effectively solve the problem in the case that local sites entirely fail or that data is destroyed when encountering natural or man-made disasters. Meanwhile, through bandwidth policies, incremental transmission or compression function, network conditions of different qualities can be used, and relatively good remote replication performance can be obtained even facing network environment with relatively low speed. Everyday tape backup (fully or incremental) can be replaced by various high performance data backup techniques and the log shipping technique described in this table. |

Although the present invention has been described in conjunction with the embodiments that have been considered as most practical and optimal at present, it is understood by those skilled in the art that the present invention is not limited to the disclosed embodiments. On the contrary, the present invention aims at covering various modifications and equivalent structures included in the spirit and scope of the attached claims.

What is claimed is:

1. A centralized management mode backup disaster recovery system, comprising:

a centralized control console (104) for performing centralized control on a data container (105), a backup process module (103), storage medium (101), and a standby machine (102) through respective control operations, and backup disaster recovery settings and operations of different machines and different platforms are controlled by the centralized control console to implement fully automatic service transfer, failover, automatic virtualization, acknowledgement of snapshot success, snapshot centralized management, and auto-drill;

a production server (108) installed with software which is host-based and has a plurality of different setting options embedded inside, the production server (108) being responsible for controlling and managing data circulation between the production server and storage medium in unit of data blocks;

a backup process module (103) for backing up data to storage space allocated for the production server (180) by the storage medium (101);

the storage medium (101) for storing data and allocating a logic unit (200) to the production server (108) for data storage;

the standby machine (102) for storing system data of the production server (108) and completing automatic running and setting of the standby machine (102) through the control console (104); and the data container (105) for recording operation modes, data information, and command requests of the control console (104), the production server (108), the backup process module (103), the storage medium (101), and the standby machine (102) through data condition update;

wherein the system converts a system disk mirror of the production server backed up in the storage medium to a standby system recognizable by a virtual platform standby machine by using an automatic virtualization technique to enable the standby system to operate as virtual machine mode, and completes automatic running and setting of the virtual platform standby machine through the control console (104);

wherein the control console (104) obtains multiple versions of snapshots of backup data, the snapshots of backup data are stored in the storage medium Which can be mounted by setting separation between virtual standby machine network and production network through the control console (104) and can be assigned to the virtual platform standby machine, the system disk of the production server loaded by the virtual platform standby machine remains unchanged, and the virtual platform standby machine is initiated to perform a periodical drill independent from the production server;

wherein the autodrill includes all of the following: initiating the standby machine and loading a backup mapping in non man-made interference and computer programming control manner, and checking availability and integrity of the backup data in non man-made and computer programming control manner.

2. The system according to claim 1, wherein the backup process module (103) includes synchronous or asynchronous data replication and mirror techniques in man-made manner, client program manner, driver program manner, or monitoring program manner.

3. The system according to claim 1, wherein the backup process module (103) of the production server (108) can monitor resource usage situation of the whole backup disaster recovery system through the control console (104) to control resources used by the backup process module (103).

4. The system according to claim 1, wherein the storage medium (101) comprises storage devices using magnetic disks, Flash disks, and optical disks as media and supporting direct connection mode, Fiber Channel FC connection mode, and Internet Small Computer System Interface ISCSI connection mode.

5. The system according to claim 1, wherein data stored in the logic unit (200) of the storage medium (101) includes basic data and a snapshot, and the snapshot is a complete mapping of data contents and conditions of the logic unit (200) at a specific time point.

6. The system according to claim 1, wherein basic data and a snapshot stored in the logic unit (200) of the storage medium (101) are written in a disk of the production server (180) through data restoration.

7. The system according to claim 1, wherein the standby machine (102) comprises computer devices such as physical entity computers or virtual computers.

8. The system according to claim 1, wherein the control console (104) comprises interactive programs running in command line manner, visual program interface manner, or browser Web manner.

9. The system according to claim 1, wherein when a system of the production server (180) fails, and the control console (104) performs control to assign data in the storage medium (101) to the standby machine (102) and initiate the standby machine (102) to recover production.

10. The system according to claim 1, the control console (104) can also perform control to directly back up data in the logic unit (200) of the storage medium (101) into tapes.

11. The system according to claim 1, wherein the data container (105) includes local, remote, or distributed data records or database.

12. The system according to claim 1, wherein the system can also perform remote backup through the control console (104) to back up data in the storage medium (101) to another storage medium through remote network.

13. A server including a centralized management mode control console applicable in a backup disaster recovery/service continuity system including one or more of a backup process module, storage medium, and a virtual platform standby machine, comprising:

a data container for recording data information and various command requests issued respectively by a control console, a production server, the backup process module, the storage medium, and the virtual platform standby machine with a data carrier through data condition update; and a control console program module for performing backup disaster recovery and service continuity control on the data container, the backup process module, the storage medium, and the virtual platform standby machine respectively through respective control operations, the control console program module performs following operations:

automatically constructing the virtual platform standby machine, converting a system disk mirror of the production server backed up in the storage medium to a standby system recognizable by the virtual platform standby machine by using an automatic virtualization technique to enable the standby system to operate as virtual machine mode, completing automatic running and setting of the virtual machine through the centralized management control console, and constructing the virtual platform standby machine that can be actually effectively used on the virtual platform; and performing an autodrill process, wherein the control console (104) obtains multiple versions of snapshots of backup data, the snapshots of backup data are stored in the storage medium which can be mounted by setting discrete functionality between virtual platform standby machine network and production network, and can be assigned to the virtual platform standby machine, the system disk of the production server loaded by the virtual platform standby machine remains unchanged, and the virtual platform standby machine is initiated to perform a periodical drill independent from the production server;

wherein the autodrill includes all of the following: initiating the standby machine and loading a backup mapping in non man-made interference and computer programming control manner, and checking availability and integrity of the backup system, programs, and data in non man-made and computer programming control manner.

14. The centralized management mode control console according to claim 13, further comprising: with respect to general database servers, data can be periodically added into a predefined test table, and the number of recordings can be checked through script programs during the autodrill operation.

15. The centralized management mode control console according to claim 13, further comprising: one test mail can be sent to the virtual platform standby machine through a mail server each day, so as to check whether the autodrill results obtained by this mail exist in the snapshot or not by using the programs or the scripts.

16. The centralized management mode control console according to claim 13, the standby machine comprises computer devices such as physical entity computers or virtual computers.

17. The centralized management mode control console according to claim 13, wherein the data container includes local, remote, or distributed data records or database.

18. The centralized management mode control console according to claim 13, wherein the control console program module comprises interactive programs running in command line manner, visual program interface manner, or browser Web manner.

19. A centralized management mode control method of a centralized management mode backup disaster recovery system including a data container, a backup process module, storage medium, and a standby machine, comprising:
centralized control is respectively performed on the data container, the backup process module, the storage medium, and the standby machine according user selection through respective control operations by a control console, backup disaster recovery settings and operations of different machines and different platforms are consistently packaged to implement fully automatic service transfer, failover, automatic virtualization, acknowledgement of snapshot success, snapshot centralized management, and autodrill, and the control operations performed by the control console comprise:
controlling the data container to record operation conditions, data information, and command requests of the control console, a production server, the backup process module, the storage medium, and the standby machine through data condition update;
controlling the storage medium to allocate storage space to the production server to perform backup for data of the production server;
converting a system disk mirror of the production server backed up in the storage medium to a standby system recognizable by a virtual platform standby machine by using an automatic virtualization technique to enable the standby system to operate as virtual machine mode, completing automatic running and setting of the virtual machine through the centralized management control console, and constructing the virtual platform standby machine that can be actually effectively used on the virtual platform; and
controlling the standby machine to perform a autodrill process, wherein the control console (104) obtains multiple versions of snapshots of backup data, the snapshots of backup data are stored in the storage medium which can be mounted by setting separation between virtual platform standby machine network and production network and can be assigned to the virtual platform standby machine, the system disk of the production server loaded by the virtual platform standby machine remains unchanged, and the virtual platform standby machine is initiated perform periodical drill independent from the production server;
wherein the autodrill includes all of the following: initiating the standby machine and loading a backup mapping in a non man-made interference and computer programming control manner, and checking availability and integrity of the backup system, programs, and data in non man-made and computer programming control manner.

20. The method according to claim 19, wherein the backup process module includes synchronous or asynchronous data replication and mirror techniques in man-made manner, client program manner, driver program manner, or monitoring program manner.

21. The method according to claim 19, wherein the control console further monitors resource usage situation of the whole backup disaster recovery system to control resources used by the backup process module when resources used by the production network are relatively large.

22. The method according to claim 19, wherein the storage medium comprises storage devices using magnetic disks, Flash disks, and optical disks as media and supporting direct connection mode, Fiber Channel FC connection mode, and Internet Small Computer System Interface ISCSI connection mode.

23. The method according to claim 19, wherein data stored in the logic unit of the storage medium includes basic data and a snapshot, and the snapshot is a complete mapping of data contents and conditions of the logic unit at a specific time point.

24. The method according to claim 19, further comprising data restoration for writing basic data and a snapshot stored in the logic unit of the storage medium into a disk of the production server.

25. The method according to claim 19, wherein the data container includes local, remote, or distributed data records or database.

26. The method according to claim 19, wherein the control console comprises interactive programs running in command line manner, visual program interface manner, or browser Web manner.

27. The method according to claim 19, further comprising assigning data in the storage medium to the virtual platform standby machine and initiating the virtual platform standby machine to recover production when a system of the production server fails.

28. The method according to claim 19, further comprising directly backing up the data in the logic unit of the storage medium to tapes.

29. The method according to claim 19, further comprising a remote backup process for backing up the data in the storage medium to another storage medium through remote network.

* * * * *